T. F. SANBORN.
EVAPORATING APPARATUS.
APPLICATION FILED DEC. 28, 1910.
1,028,792.
Patented June 4, 1912.
3 SHEETS—SHEET 1.
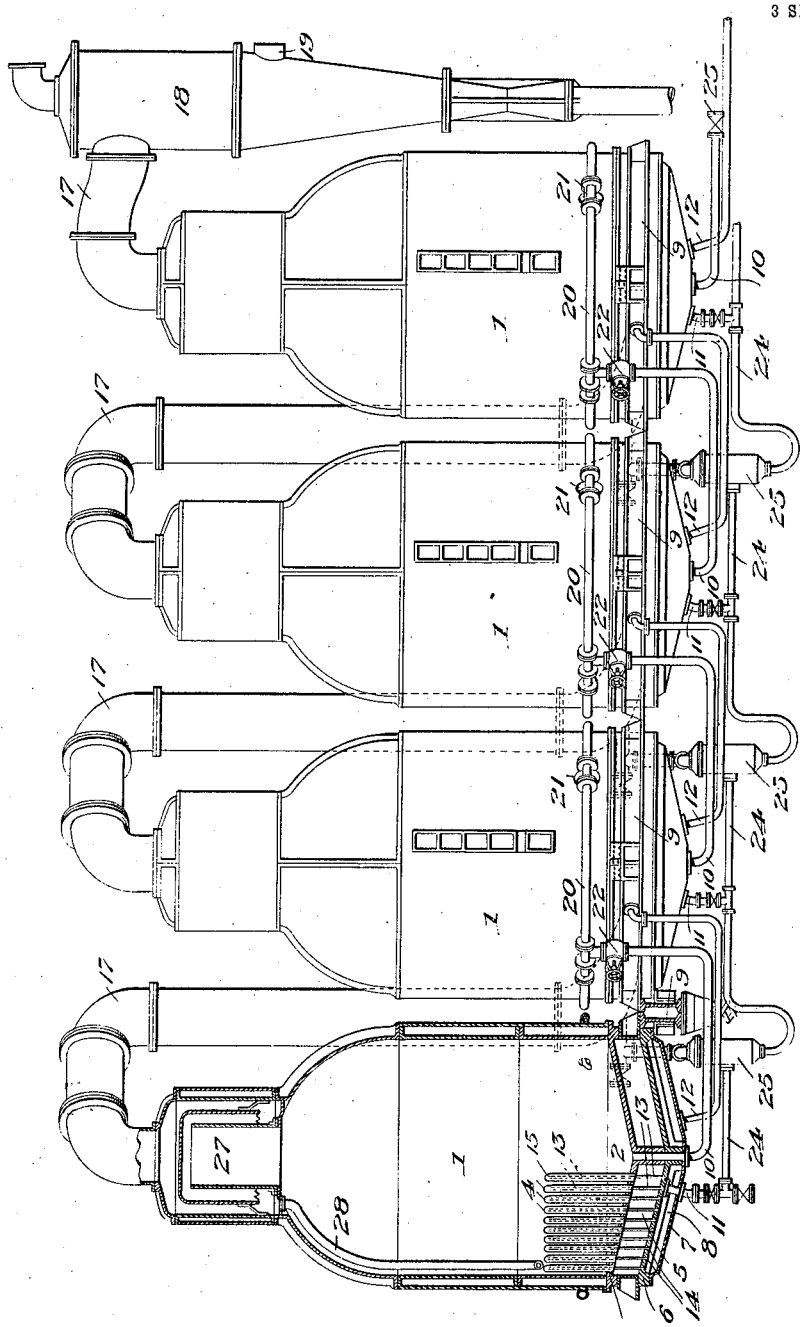

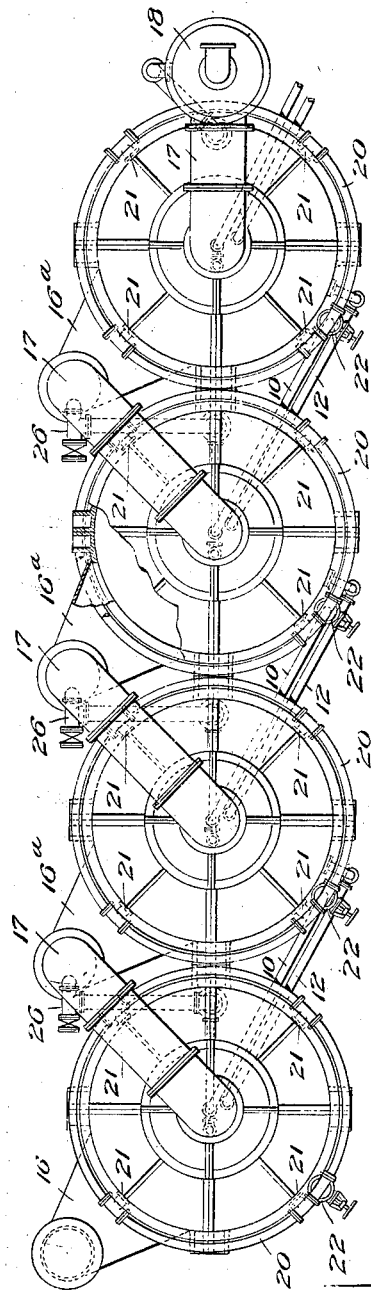

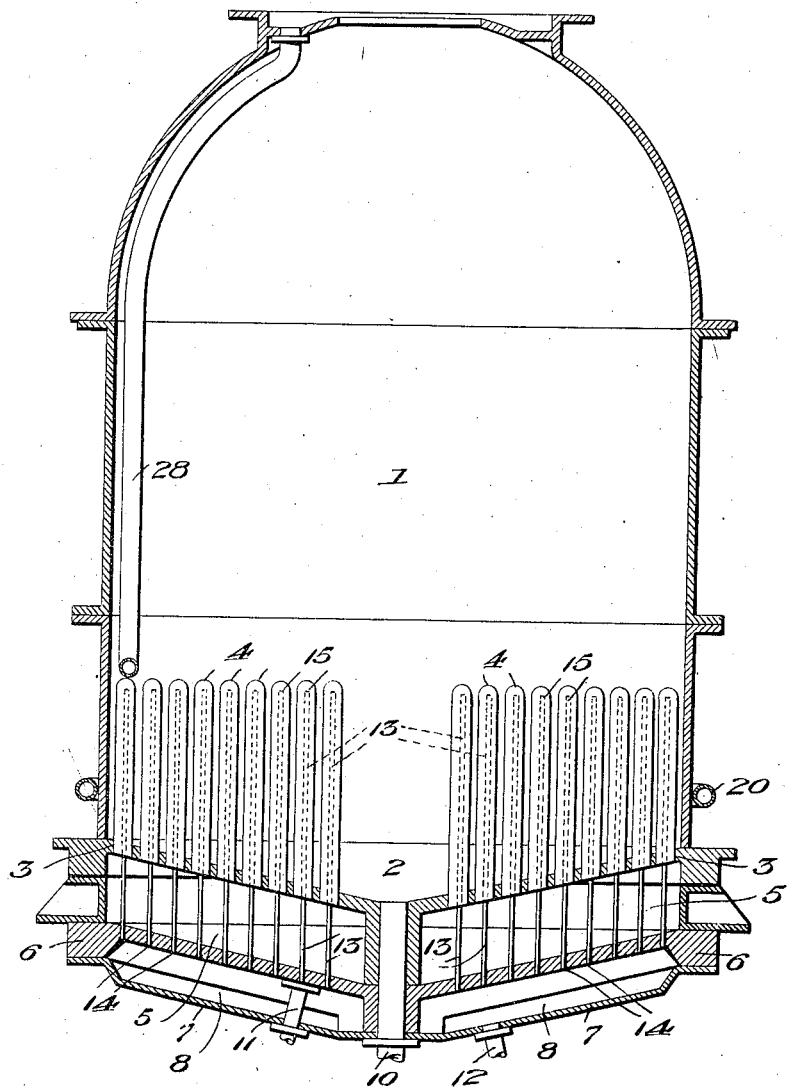

UNITED STATES PATENT OFFICE.

THORNTON F. SANBORN, OF ENSENADA, PORTO RICO, ASSIGNOR TO SANBORN EVAPORATOR COMPANY, A CORPORATION OF DELAWARE.

EVAPORATING APPARATUS.

1,028,792. Specification of Letters Patent. Patented June 4, 1912.

Application filed December 28, 1910. Serial No. 599,773.

*To all whom it may concern:*

Be it known that I, THORNTON F. SANBORN, a citizen of the United States, residing at Ensenada, Porto Rico, have invented certain new and useful Improvements in Evaporating Apparatus, of which the following is a specification.

This invention relates to evaporating apparatus.

The present invention has reference, more particularly, to that class of vacuum sugar evaporating apparatus known as "effects" and has relation to the individual "effects" or units as well as to their association in batteries of two to eight, or even more, cells.

In the present invention, heating of the juice in the cell is accomplished by vertical tubes closed at their upper ends and having their lower ends in communication with a steam chamber from which they are heated. Arranged within the heating tubes in a novel manner and communicating with a separate chamber are take-off tubes by which the non-condensable gases within the said heating tubes are instantaneously and constantly drawn off, insuring free access of the steam to all points of the heating tubes and uniform heating of the entire surface thereof and the greatest possible heating effect on the juice in the cell and permitting the ready removal, by flaking, of any incrustation forming on the exterior of said heating tubes.

Cells embodying the invention set forth may be combined in multiple effect to any extent desired, the partially evaporated juice and the vapors arising from ebullition thereof being carried from one cell or effect to another, in succession, the condensation of water and non-condensable gases from the heating tubes of a preceding cell being carried to a succeeding cell, and so on through the series, but such arrangement is not essential as they may be taken off from the respective cells as fast as formed, if preferred. In each cell or effect is a vapor separator for returning to the cell such juices as may have entrained with the vapors passing to the succeeding cell.

In the accompanying drawings:—Figure 1 is a side elevation of a quadruple effect, one of the cells being in section to show the invention, and only a portion of the heating tubes and take-off tubes being shown; Fig. 2, a plan view thereof; and Fig. 3 a vertical section through one of the cells, the tubes being in full and dotted lines and the separator being removed.

The cells or effects 1 may be used singly or in any desired multiples such as two, four, six, eight, or even more, a quadruple effect being illustrated. The cells or effects are of the same construction and the description of one only will be given.

The cell has a bottom or tube sheet which is inclined, being preferably of the conical form shown. Expanded into the bottom or tube sheet 2 at 3 are concentric circles of individual heating pipes or tubes 4 whose upper ends are closed. These heating tubes may be of copper, brass, iron, or other suitable material according to the character of the liquid to be evaporated. Their only openings are their mouths at their lower ends which open into the steam or heating chamber 5 below said bottom or tube sheet 2 and defined by the head or bottom plate 6. Below the head or bottom plate 6 is a plate 7 which, in connection with head 6, defines a non-condensable gas chamber 8. The sheets or plates 2, 6 and 7 are suitably secured together and to the body of the cell, the respective cells or effects being supported by channel and I-beams 9 in turn suitably supported on columns or other suitable foundation.

The sheets or plates 2, 6 and 7 are substantially parallel, being of concaved or dished form so that the juice will gravitate from the bottom of sheet 2 through the juice outlet pipe 10, the water of condensation will pass out through the outlet 11 and the non-condensable gases will pass out readily through the outlet 12. Expanded or otherwise suitably secured in the head 6 are the take-off tubes 13 which open at their lower ends 14 into the chamber 8 and extend up through chamber 5 into the respective heating tubes 4 to near or at the top or closed upper ends thereof, into which they open at 15.

The steam from chamber 5 which passes into the heating tubes 4, heats the juice in the cell and keeps it boiling. A certain amount of this steam will condense within the tubes 4 and flow by gravity into the chamber 5 and drain off through the outlet 11 but considerable volumes of non-condensable gases are evolved which, in practice, tend to remain in the heating tubes of whatever type may be employed in the cell, thus deadening the heating effect of the steam on the juice at certain areas of the tubes. Were the take-off tubes not employed, the tendency of these non-condensable gases would be to remain in the upper parts of the heating tubes and to deaden them, but a vacuum, as will presently appear, acting on the tubes 13 causes all non-condensable gases to be drawn down from the heating tubes 4 through said tubes 13, into the chamber 8 and out through the outlet 12 so that every part of the heating tubes 4 is effective in conveying heat to the juice in the cell and the drainage and carrying off of the non-condensable gases is insured, all of the heating tubes being under uniform pressure at all times so that each receives its full quota of steam and the juice is uniformly heated. The vertical disposition of the heating tubes permits the free upward passage of the steam or heating vapor—the normal direction of travel—which is aided by the condensation occurring within the tubes and the take-off effect at the upper ends thereof due to the vacuum in the tubes 13.

The arrangement permitting of the perfect and uniform heating of all of the heating tubes by the steam, the natural expansion of the tubes may be availed of to aid in the removal of incrustations that may accumulate on the outside of the tubes for, by merely raising the temperature of the cell, a greater expansion of the heating tubes 4 occurs, which, being inside the film of incrustation, flakes it off.

The steam is admitted to the first cell of the series through the inlet 16 (Fig. 2), directly entering chamber 5. The upper part of each cell, save the last of the series, is connected to the steam space 5 of the succeeding cell by a vapor pipe 17, the vapor pipe of the final cell or effect being connected to the condenser 18 which is coupled at 19 to a suitable vacuum pump whereby a vacuum, graded in degree from the weakest in the first cell to the strongest in the final cell of the series, is maintained in said cells.

The respective cells are encircled, preferably, by juice supply pipes 20 which have juice inlets 21 leading to the cell at a plurality of points. The juice is initially supplied to the pipe 20 of the first cell and the outlet pipe 10 of each cell, save the last of the series, is connected to the pipe 20 of the succeeding cell, suitable valves 22 being interposed at points of the piping for the control of the juice. The juice outlet from the final cell or effect is coupled to a pump at 23.

All of the condensation water outlets 11 are connected to a line of piping 24 in which is interposed separators 25 which are in turn connected by pipes 26 to the vapor inlets 16ª, of all cells following the first of the series so that any steam or vapor accompanying the water condensation is delivered directly to the steam chamber 5 of the succeeding cell and thus the full heating effect is conserved. The non-condensable gases passing out through the outlet 12 are preferably taken to the steam space 5 of the succeeding cell for the utilization of the heat thereof. Preferably in the upper part of each cell there is provided a separator 27 provided with a back flow or drain pipe 28 leading down to the juice above the heating tubes 4 for the delivery back into the cell of any juice which may have entrained with the vapor passing from the cell.

It is preferable for rapid and economical operation that the admission of thin juice to the first cell or effect and its transit from cell to cell and its withdrawal as a finished product from the final cell or effect be a continuous, regular operation but not necessarily so because the juice may be taken off from any cell. Likewise, it is preferable, though not necessary, that the water of condensation be separated and any entrained steam carried into the steam space of the succeeding cell; also, that the non-condensable gases of one cell be led to the steam space of a succeeding cell, but the invention is not limited to this successive treatment as the water of condensation and the non-condensables may be taken off separately from the respective cells or effects.

In boiling in the first cell, the juice becomes heavier, and this partially evaporated liquid is drawn by the vacuum into the succeeding cell through the pipe 10 and again leaves that cell through the correspondingly designated pipe to pass to a following cell, further evaporation occurring in each cell and final evaporation in the final cell or effect, the finished product being withdrawn by the pump coupled at 23. The rapid ebullition frequently carries along with the vapor which passes through the pipes 17, minute particles of the liquid under treatment. The separators 27 return this entrained liquor to the cell from which it is drawn, permitting only the steam or vapor to pass through the pipes 17 to the succeeding cells. The non-condensable gases are drawn by the vacuum from one cell to the other, the complete heat effect thereof being thus obtained.

In the use of the word "wall", wherever appearing in the claims, I intend to cover all positions of the heating tubes, whether extending into the evaporating chamber from the bottom thereof, the sides, or the top, as the heating tubes and the takeoff tubes may be arranged otherwise than at the bottom of the evaporating chamber.

Having thus described my invention, what I claim as new and desire to secure by Letters Patent, is:—

1. An evaporating effect or cell, having an inclined tube sheet or bottom, for the evaporating chamber, upwardly extending heating tubes closed at their upper ends and having their lower ends secured to and opening through the said inclined bottom, a juice take-off or outlet leading from the said inclined bottom, a steam chamber below said tube sheet and which has an inclined bottom, take-off tubes secured to and opening through said inclined bottom of the steam chamber and having their upper parts extending into the heating tubes to near the upper closed ends thereof and there open to the interior of the heating tubes, a condensation outlet for the steam chamber, a chamber below the steam chamber and with which the take-off tubes communicate and an outlet for said chamber last-named, said outlet being subject to vacuum, whereby the non-condensable gases are drawn off from the heating tubes.

2. A multiple evaporating effect having a plurality of cells, each cell having in combination, heating tubes closed at one end and secured at the other end to a wall of the evaporating chamber and opening therethrough, a steam chamber with which said heating tubes communicate, take-off tubes extending into the heating tubes and open to the interior thereof, and means for conveying the non-condensable gases from the heating tubes of one cell through the take-off tubes thereof to the steam chamber of a succeeding cell.

3. A multiple evaporating effect, having a plurality of cells, each cell having in combination, a bottom for the evaporating chamber, upright heating tubes closed at their upper ends and secured at their lower ends to the bottom and opening therethrough, a steam chamber with which said heating tubes communicate, take-off tubes extending up into the heating tubes and open to the interior thereof, a pipe line for taking off the water of condensation from the respective cells, and separators in said pipe line for conveying to the steam space of a succeeding cell the vapor or steam entraining with the condensation water flowing from a preceding cell.

4. A multiple evaporating effect, having a plurality of cells, each cell having in combination with the evaporating chamber thereof, heating tubes imperforate where disposed within the evaporating chamber, a steam chamber with which the heating tubes communicate, take-off tubes communicating with the interior of the said heating tubes, a chamber with which the take-off tubes communicate, vacuum producing means for the multiple effect, and means affording communication between the chamber with which the take-off tubes communicate in a given cell and the steam chamber of a succeeding cell, whereby the non-condensable gases are removed from the heating tubes of the respective cells.

In testimony whereof, I hereunto affix my signature in presence of two witnesses.

THORNTON F. SANBORN.

Witnesses:
 GEO. A. HAMLIN,
 S. V. LOCKWOOD.